United States Patent
Tanis (10) Patent No.: US 6,688,970 B2
(45) Date of Patent: Feb. 10, 2004

(54) COMBINE THRESHING ROTOR FRONT BEARING AND INLET SECTION WITH ANTI-WIND GEOMETRY

(75) Inventor: Dale R. Tanis, Geneseo, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/002,455

(22) Filed: Nov. 15, 2001

(65) Prior Publication Data

US 2003/0092474 A1 May 15, 2003

(51) Int. Cl.⁷ .................................................. A01F 12/00
(52) U.S. Cl. .......................................... 460/68; 460/70
(58) Field of Search ..................... 460/68, 70; 198/660, 198/661, 676

(56) References Cited

U.S. PATENT DOCUMENTS

| | | | |
|---|---|---|---|
| 2,493,105 A | 1/1950 | Bunting | 130/27 |
| 3,481,343 A | 12/1969 | Van Buskirk | 130/27 |
| 3,534,742 A | 10/1970 | Knapp | 130/27 |
| 3,794,047 A | 2/1974 | De Coene et al. | 130/27 |
| 3,848,609 A | 11/1974 | Mortier et al. | 130/27 |
| 3,982,549 A | 9/1976 | De Pauw et al. | 130/27 |
| 3,995,645 A | 12/1976 | Rowland-Hill | 130/27 |
| 4,136,704 A | 1/1979 | Dyke | 130/27 |
| 4,149,360 A | 4/1979 | Rowland-Hill | 56/14.6 |
| 4,248,248 A | 2/1981 | De Busscher et al. | 130/27 |
| 4,250,896 A | 2/1981 | Wagstaff et al. | 130/27 |
| 4,266,560 A | 5/1981 | Powell et al. | 130/27 |
| 4,269,200 A | 5/1981 | Gorsler | 130/27 |
| 4,344,442 A | 8/1982 | Torland et al. | 130/27 |
| 4,653,515 A | 3/1987 | Tophinke | 130/27 |
| 4,733,672 A | 3/1988 | Tophinke | 130/27 |
| 4,900,290 A * | 2/1990 | Tanis | 460/70 |
| 4,936,810 A | 6/1990 | Strong et al. | 460/69 |
| 4,946,419 A | 8/1990 | Cromheecke et al. | 460/68 |
| 4,964,838 A | 10/1990 | Cromheecke et al. | 460/66 |
| 4,986,794 A | 1/1991 | Ricketts | 460/67 |
| 5,145,462 A | 9/1992 | Tanis et al. | 460/68 |
| 5,364,306 A | 11/1994 | Soots et al. | 460/68 |
| 5,387,153 A | 2/1995 | Tanis | 460/68 |
| 5,454,758 A | 10/1995 | Tophinke et al. | 460/68 |
| 5,562,540 A | 10/1996 | Balmer | 460/65 |
| 5,919,086 A | 7/1999 | Derry | 460/72 |
| 6,036,598 A | 3/2000 | Harden et al. | 460/66 |
| 6,050,894 A | 4/2000 | Johnson | 460/68 |
| 6,083,102 A | 7/2000 | Pfeiffer et al. | 460/68 |
| 6,129,629 A | 10/2000 | Dammann et al. | 460/67 |
| 6,296,566 B1 | 10/2001 | Tanis et al. | 460/70 |

* cited by examiner

Primary Examiner—Thomas B. Will
Assistant Examiner—Meredith Petravick
(74) Attorney, Agent, or Firm—John William Stader; Collin A. Webb (57) ABSTRACT

A threshing rotor and front bearing housing shroud assembly for an agricultural combine having improved anti-wind characteristics, particularly with regard to long, wet straw. The invention resides in a front rotor inlet or infeed section having at least one radially outwardly extending impeller or auger flight having a front leading edge extending radially outwardly from a front center portion so as to be swept back relative to the rotational direction of the auger and so as to radiate from inwardly of, and form at least a 90 degree included angle in relation to, a wiping surface and anti-wind wiper of the shroud. A generally annular space exists between the shroud and a front bearing housing substantially surrounded thereby, and at least one radially outwardly raked anti-wind lug on the front center portion of the inlet section rotates through the space to agitate and clear plant material therefrom through pathways provided through the shroud for the flow of the plant material from the space.

16 Claims, 6 Drawing Sheets

COMBINE THRESHING ROTOR FRONT BEARING AND INLET SECTION WITH ANTI-WIND GEOMETRY

TECHNICAL FIELD

The present invention relates generally to agricultural combine rotors, and more particularly, to a front bearing housing and rotor front inlet section combination having anti-wind geometry for preventing winding or wrapping of plant materials therearound.

BACKGROUND ART

A well-known form of harvesting machine is a rotary combine. A typical combine includes a crop harvesting apparatus which reaps grain stalks and other plant materials and feed them to a separating or threshing apparatus. The grain stalks or other crop and plant materials harvested in the field are moved rearwardly from a crop harvesting header assembly and introduced for threshing to the rotor assembly by a crop feeder assembly.

In a rotary combine, the rotor assembly includes a generally tubular rotor housing mounted in the combine body. A driven rotor is coaxially mounted within the housing. The rotor comprises an infeed or inlet section and a cylindrical threshing section, and is supported at opposite ends by front and rear bearing assemblies.

The cylindrical threshing section of the rotor and the rotor housing mount cooperating threshing elements which separate grain from other material in a threshing zone. The crop material is threshed as it spirals around the rotor threshing section and passes through openings in the rotor housing.

As discussed in Tanis U.S. Pat. No. 5,387,153, assigned to the same assignee as the present invention, the ability to transfer crop materials from the feeder assembly to the threshing zone of the rotor assembly is a key to efficient combine operations. Most rotary combine rotors include an infeed or inlet section impeller comprised of a series of impeller blades or flights arranged at a forward end of the rotor. The impeller flights rotate within a housing which is a part of the rotor housing. During harvesting operations, the generally linear movement of the crop materials received from the feeder assembly is converted by the rotating impeller flights into a rotating, circulatory movement, in a rearward and outward direction.

When rotary combines are used on certain long-stemmed leguminous or grassy crops, such as windrowed perennial or annual rye grass, clover, and bent grass, there is a potential for portions of such grassy crops and other plant materials such as weeds to extend into the impeller flights while other portions remain partially engaged with the feeder assembly. The latter portions tend to move toward the axis of rotation of the rotor assembly, and may wrap about the front rotor bearing or shaft.

Long-stemmed leguminous or grassy crops also have a tendency to wrap around or "hairpin" about the leading edge of the impeller blades or flights. This hairpinning action can create a buildup of crop materials on the aforementioned leading edge, which reduces the effectiveness of the impeller and further reduces combine efficiency.

Numerous impeller designs, including that disclosed in the above referenced Tanis patent, have been proposed to prevent crop materials from becoming entangled with the front rotor bearing and prevent hairpinning about the impeller blades, leading edges. None has been thoroughly successful in doing so, however. Furthermore, these designs suffer from a multitude of individual parts, and the higher costs associated therewith.

Tanis U.S. Pat. No. 6,296,566, also assigned to the same assignee as the present invention, discloses an infeed impeller for a rotary combine which utilizes anti-winding vanes on the rotor which cooperate with vanes on the front bearing assembly to force debris radially outwardly away from the axis of the rotor. However, this combination has been found to also suffer from shortcomings, namely, that long, particularly wet, crop material winds onto the rotor shaft which creates heat, consumes power, and causes early bearing failures.

Accordingly, what is sought is a front bearing housing and rotor auger inlet impeller flight combination which provides improved anti-wind characteristics, particularly with regard to long, wet straw.

SUMMARY OF THE INVENTION

According to the invention, a threshing rotor and front bearing housing shroud assembly for an agricultural combine having improved anti-wind characteristics, particularly with regard to long, wet straw, is disclosed. The invention includes a front rotor inlet or infeed section having a front center portion, the front rotor inlet section being rotatable with the rotor in a predetermined rotational direction about an axis extending through the front center portion, the front center portion including a radial outer circumferential edge portion having a predetermined radial extent, and at least one impeller or auger flight having a front leading edge extending radially outwardly from the front center portion so as to be swept back relative to the predetermined rotational direction. The invention includes a front bearing housing positionable in front of the front rotor inlet section in rotatable connection with and in closely spaced opposing relation to the front center portion for supporting the front rotor inlet section about the axis, the front bearing housing including a radial outer circumferential surface having a predetermined radial extent. A shroud extends at least partially circumferentially around the front bearing housing, the shroud having a radial inner circumferential surface having a predetermined redial extent which is greater than the radial extent of the front bearing housing such that a generally annular space is disposed therebetween, and also greater than the radial extent of the front center portion so as to be located at least slightly radially outwardly thereof, the shroud including a radially outwardly facing curved anti-wind wiper surface extending tangentially and radially outwardly therefrom in the predetermined direction of rotation and in position such that when the front rotor inlet section is supported by the front bearing housing and rotated relative thereto in the predetermined rotational direction, the front leading edge of the impeller will rotate in closely spaced axially opposing relation to the anti-wind wiper and will always form at least a 90° angle thereto so as to urge plant material coming into contact therewith radially outwardly away from the front bearing housing. And, the front center portion of the front rotor inlet section includes at least one frontwardly extending lug positioned so as to project into and rotate through the space between the radial inner circumferential surface of the shroud and the radial outer circumferential surface of the bearing housing as the front rotor inlet section rotates relative thereto for agitating material that enters the space and directing the material radially outwardly therefrom.

Preferably, the at least one lug has a surface which faces the predetermined rotational direction and is swept back relative thereto, and the shroud can include one or more openings therethrough oriented in the rotational direction for the passage of material directed by the at least one lug from the space therethrough. The front bearing housing or the shroud can also include one or more edges located in the space in position such that the at least one lug will pass thereby in closely spaced relation thereto to facilitate the agitation.

Also preferably, the front center portion includes at least one radially outwardly extending anti-wind flight on the radial outer circumferential edge portion for contacting material disposed between the front center portion and the shroud and urging the material radially outwardly therefrom, the anti-wind flight preferably including a surface facing the predetermined rotational direction which is raked or oriented radially outwardly and rearwardly for urging material that comes in contact therewith in the radial outward and rearward direction.

The anti-wind swept back geometry of the inlet impeller or auger flights in combination with the shroud geometry operate to urge or move long, wet grasses and other troublesome plant material radially outwardly away from the front bearing and shaft supporting the front inlet end of the rotor, while the raked back anti-wind flights drive material that gets close to the front center portion radially outwardly and rearwardly, and the swept back internal lugs moving through the space between the shroud and bearing housing agitate and direct outwardly material which reaches that region, such that a comprehensive anti-winding and wrapping capability is effected.

BRIEF DESCRIPTION OF THE DRAWINGS

The invention, including its construction and method of operation, is illustrated more or less diagrammatically in the drawings, in which.

DETAILED DESCRIPTION OF THE INVENTION

Figure 1:
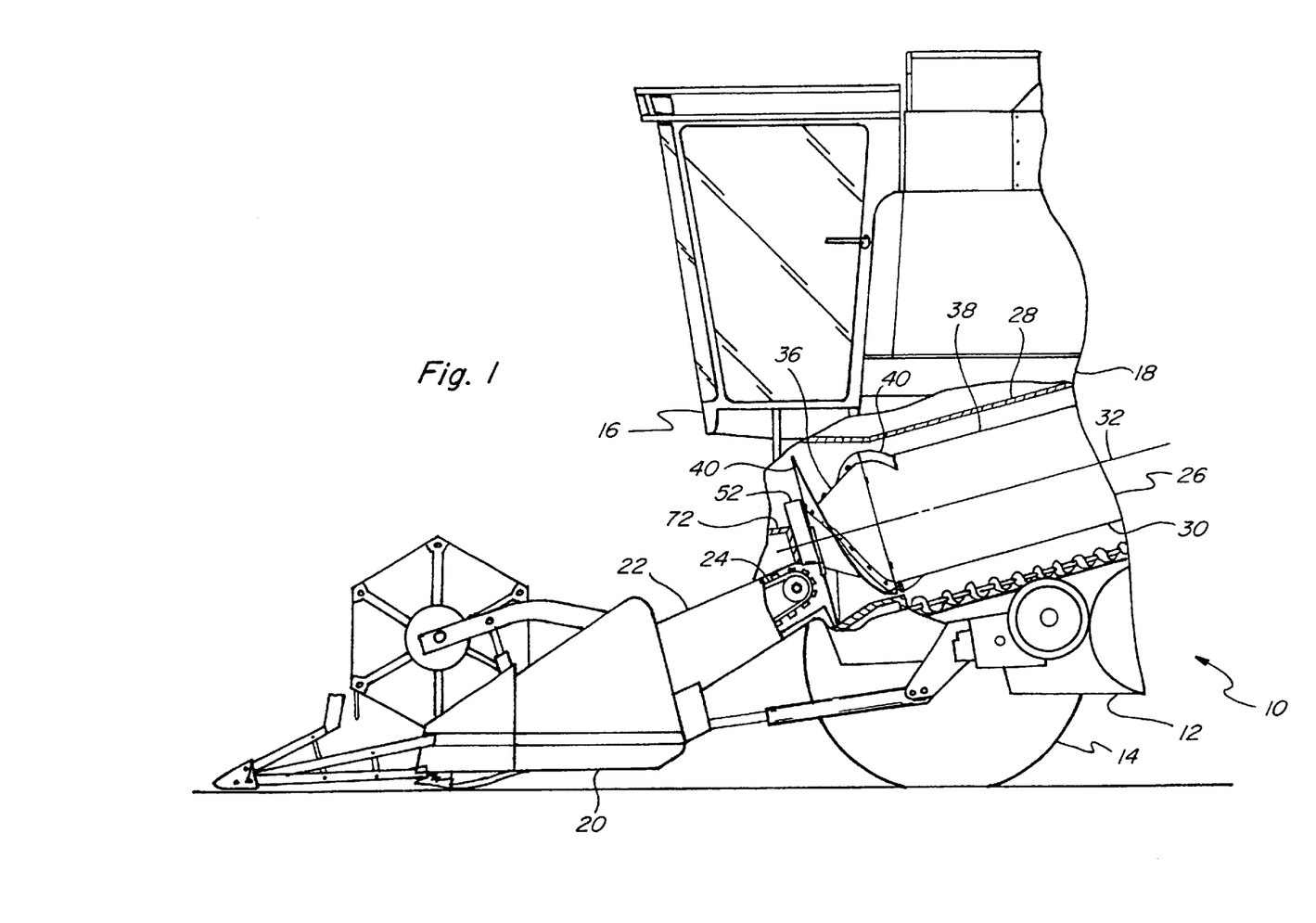
FIG. 1 is a side elevational view of a portion of a rotary combine, showing in partial section a crop feeder assembly, and a front inlet section of a threshing rotor and front bearing housing shroud assembly having improved anti-wind characteristics according to the invention.

Referring now to the drawings, in FIG. 1 a self-propelled rotary combine is seen generally at 10. Combine 10 includes a front portion 12 including front wheels 14, an operator cab 16, and an engine (not shown) suitably supported within a body 18. The transfer of power from the engine to various driven components of combine 10 is effected conventionally.

Combine 10 is provided with a crop harvesting header assembly 20 for cutting and gathering crop materials. Header assembly 20 cuts and directs the crop material into a crop feeder assembly 22 including a conveyor 24. Conveyor 24 carries the crop material upwardly toward a rotor assembly 26, which threshes grain from material other than the grain. Rotor assembly 26 is supported in a conventional manner inside body 18. Rotor assembly 26 includes a tubular rotor housing 28 mounted in a front to rear orientation in body 18. A rotor 30 is mounted in housing 28 for rotation therein in a predetermined rotational direction about an axis 32 through rotor 30 oriented at an acute angle to horizontal as shown.

Referring also to FIGS. 2, 3, 4, and 5, rotor 30 is a hollow drum rigidly affixed to a shaft 34 extending coaxially therethrough. Rotor 30 includes a front infeed or inlet section 36, and a rear threshing section 38. Front inlet section 36 includes two helical impeller augers 40 extending therearound in a rearward direction from a front center portion 42 to threshing section 38. Front inlet section has a conical shape, extending radially outwardly relative to axis 32 rearwardly from adjacent to front center portion 42 to threshing section 38. Rotor 30 is rotatable in rotor housing 28 in the direction denoted by arrow 44 in FIG. 5. Each impeller auger 40 includes a flight having a leading edge 46 which extends radially outwardly with respect to axis 32 from a radial outer circumferential edge or periphery 48 of front center portion 42 having a predetermined radial extent, and terminating at a radial outer edge 50. Each impeller auger preferably has a helical pitch that increases in the rearward direction along the length thereof, which enables augers 40 to aggressively move plant material rearwardly from feeder assembly 22 during rotation of rotor 30, while leading edges 46 is disposed and rotates in closely spaced relation to a shroud 52 which extends around and protects a front bearing housing 54 (FIGS. 2 and 6) carrying a front bearing 56 for supporting shaft 34 and thus inlet section 36 of rotor 30 for rotation, as will be explained.

Figure 6:
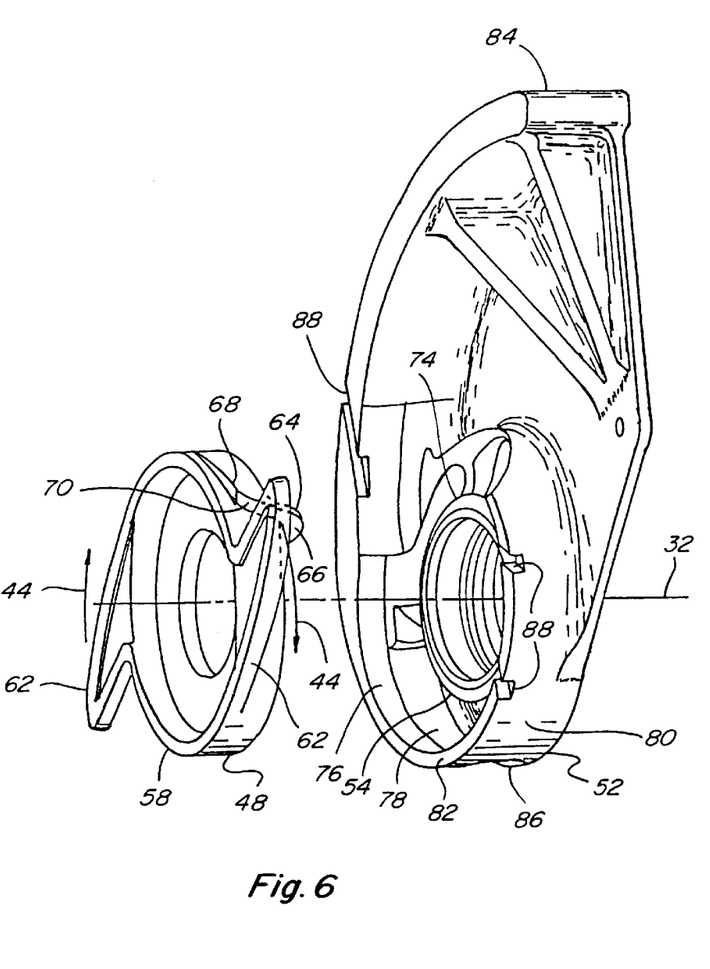
FIG. 6 is an exploded perspective view of a center plate of the rotor and a front bearing housing shroud of FIG. 1, illustrating the relationship therebetween.
Figure 7:
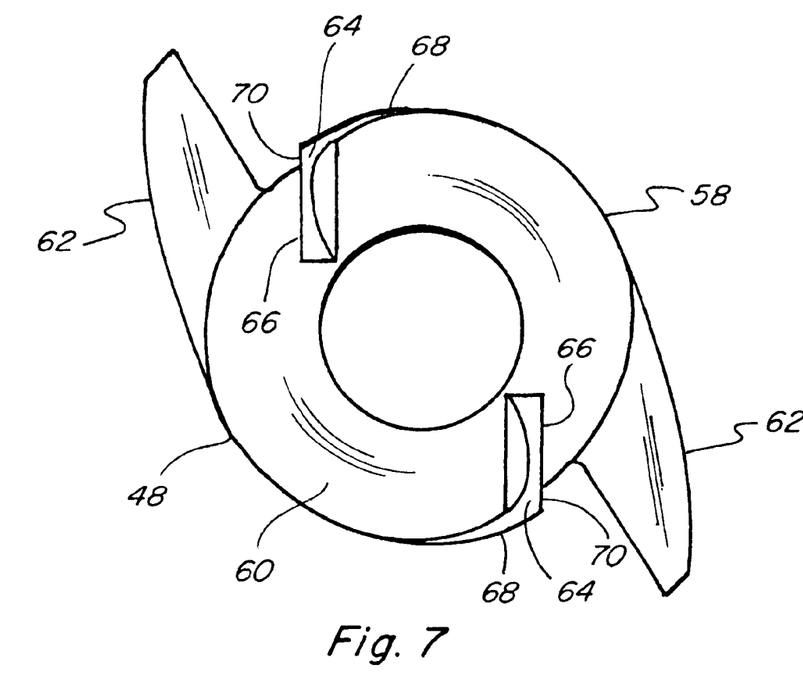
FIG. 7 is a front view of a center plate of the rotor of FIG. 1.
Figure 8:
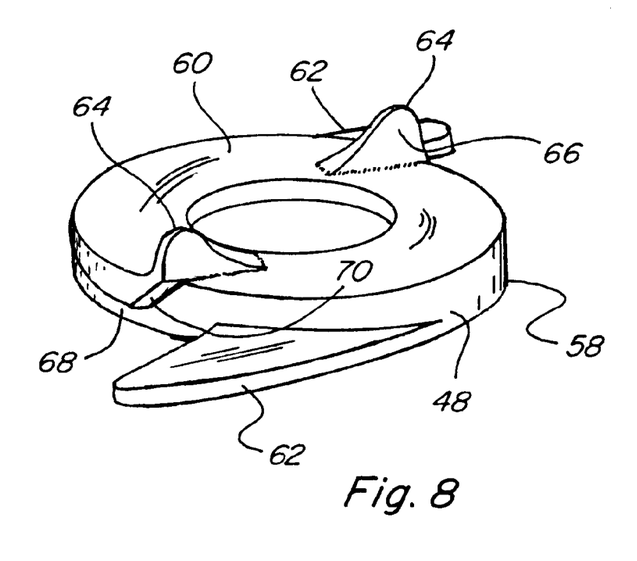
FIG. 8 is a perspective view of the center plate of the rotor of FIG. 6.

Referring also to FIGS. 6, 7, and 8, front center portion 42 of inlet section 36 is preferably located on a front plate 58 which is welded or otherwise fixedly mounted onto inlet section 36 around shaft 34. Plate 58 includes radial outer periphery 48, and a frontwardly facing surface 60. Importantly, front plate 58 includes several anti-wind elements, including radially innermost extensions 62 of leading edges 46 of impeller augers 40 which extend radially outwardly and at least generally tangentially from radial outer periphery 48 to connect in substantially flush relation to edges 46, respectively, and which are also swept back with respect to the rotational direction. Plate 58 includes anti-wind lugs 64 projecting frontwardly from surface 60, each lug 64 having a leading surface 66 oriented to face in the rotational direction and which is swept or raked back in the radial outward direction. Plate 58 includes two anti-wind flights 68 extending radially outwardly from surface 48, each flight 68 including a leading surface 70 facing the rotational direction and which is swept or raked back in the radial outward direction and also rearwardly.

Figure 2:
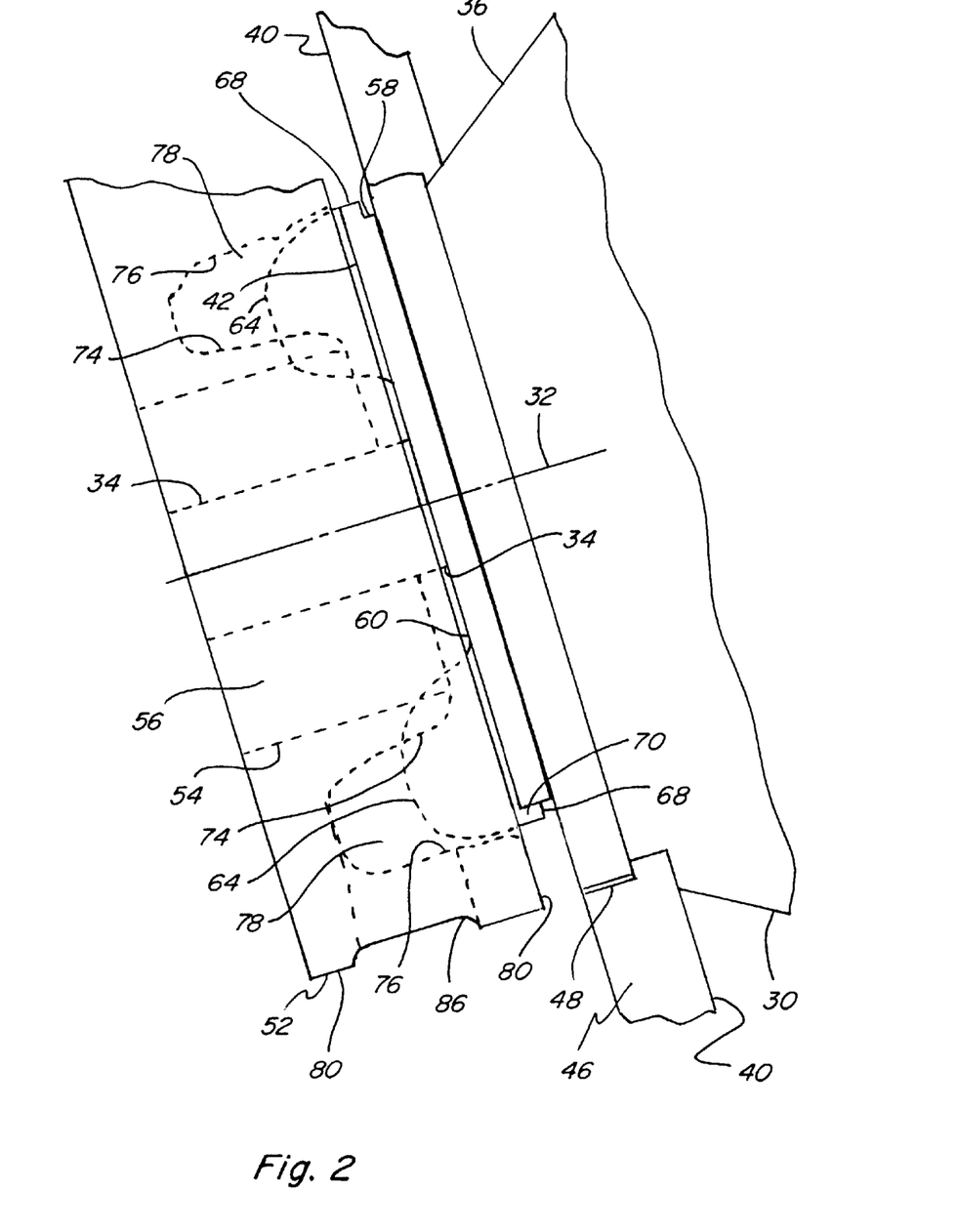
FIG. 2 is an enlarged fragmentary side view of the front rotor inlet section and bearing housing shroud of FIG. 1.
Figure 3:
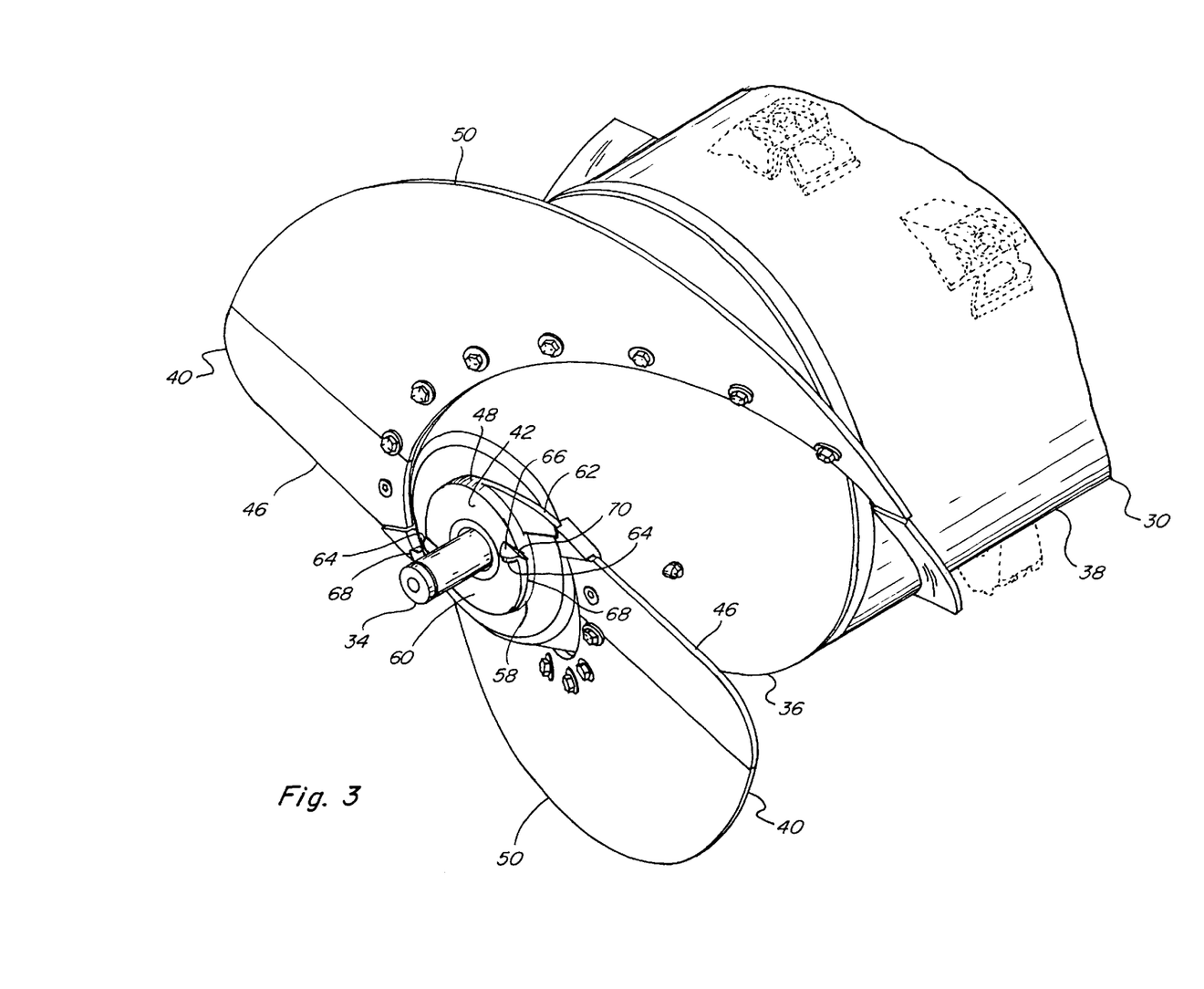
FIG. 3 is fragmentary perspective view of the rotor of FIG. 1.
Figure 4:
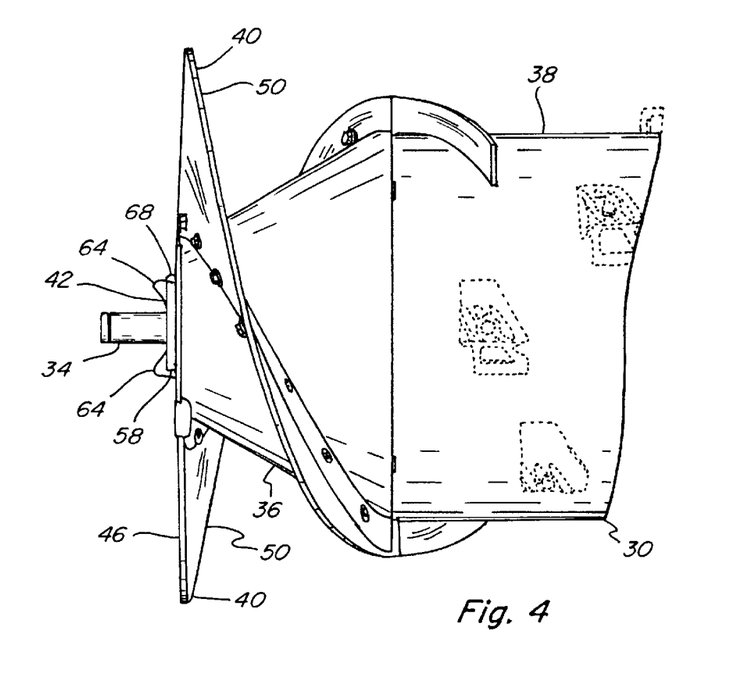
FIG. 4 is a fragmentary side view of the rotor of FIG. 1.
Figure 5:
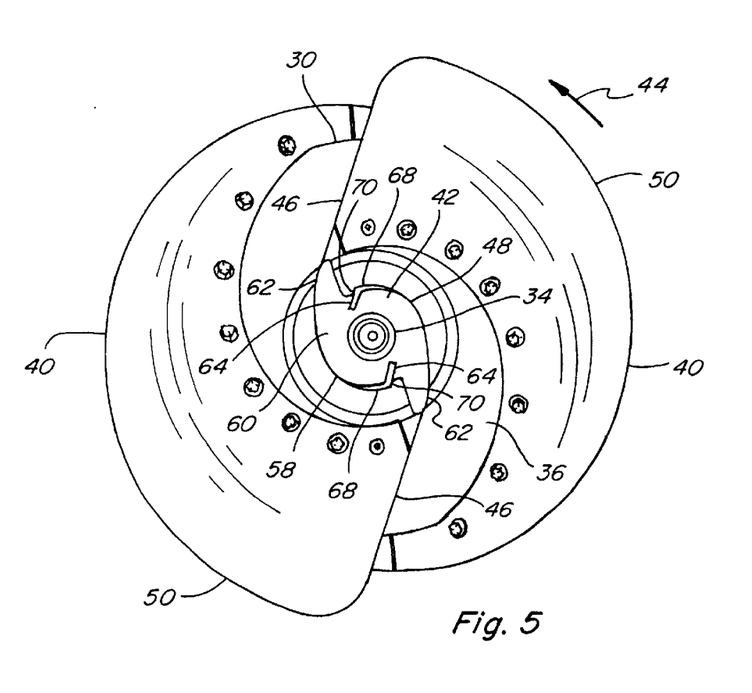
FIG. 5 is a front view of the rotor of FIG. 1.

Referring more particularly to FIGS. 1, 2, and 6, shroud 52 is mounted on a support arm 72 frontwardly of inlet section 36 of rotor 30 (FIG. 1), and is preferably integrally formed or cast with front bearing housing 54. Front bearing housing contains and carries conventional bearing 56 for rotatably supporting shaft 34 for rotation about axis 32, shaft 34 being affixed to and rotatably carrying and supporting inlet section 36 in the conventional manner. Bearing housing 54 has a circumferential radial outer surface 74 therearound having a predetermined radial extent. Shroud 52 has a radial inner surface 76 having a predetermined radial extent which is greater than that of outer surface 74 of bearing housing 54, and which is located radially outwardly thereof and extends at least partially therearound, such that at least a partial or generally annular space 78 or path extends around bearing housing 54 as defined by surfaces 74 and 76 Inner surface 76 is also of at least slightly or marginally greater radial extent than radial outer periphery 48 of front center portion 42 and particularly anti-wind lugs 64 projecting frontwardly therefrom, such that lugs 64 are received in and rotate through annular space 78 when rotor 30 is rotated. Shroud 52 has a radial outer surface 80 extending at least partially therearound, and a rearwardmost anti-wind wiper edge 82 disposed between surfaces 76 and 80 so as to be spaced just marginally radially outwardly and frontwardly of radial outer periphery 48 of front center portion 42, and closely in front of anti-wind flights 68, as best shown in FIG. 2. Radial outer surface 80 includes an anti-wind wiper 84 that extends radially outwardly preferably at least generally tangentially from surface 80 in the rotational direction denoted by arrows 44 (FIG. 6) and includes an extension of anti-wind wiper edge 82. Wiper 84 shown has a preferred generally helicoid shape with respect to axis 32 so as to guide material radially outwardly and away from the front bearing region. Shroud 52 includes an opening 86 through the lowest or bottommost portion thereof communicating or connecting with space 78. Several anti-wind openings or notches 88 also extend through edge 82, and are oriented so as to extend in the rotational direction from space 78 to outer wiping surface 80.

Superior anti-winding effect is achieved by the rotation of swept back extensions 62 of front plate 58 and leading edges 46 of impeller augers 40, in close relation to wiping surface 80 and anti-wind wiper 84, respectively. Extensions 62 begin at outer periphery 48 of front center portion 42, which is radially inwardly of wiping surface 80, and are swept back sufficiently with respect to the rotational direction, such that at least a 90 degree included angle in the rotational direction is formed between extensions 62 and surface 80, such that plant material that comes in contact with extensions 62 is always urged radially outwardly thereby during the rotation thereof. Because leading edges 46 of augers 40 are swept back continuations of extensions 62 and augers have rearwardly increasing pitch, the material, including long wet material, is advantageously carried radially outwardly and rearwardly thereby, away from proximity to shroud 52, and hairpinning and wrapping about augers 40 is avoided. Another advantage of connecting leading edges 62 to augers 40 is that they thus perform both augering and anti-wind functions, thereby eliminating the need for additional, separate anti-wind devices extending into the crop material flow path in the infeed region. Leading edges 62 are positioned, oriented, and function in the same manner in relation to anti-wind wiper 84, namely, leading edges 62 and wiper 84 always form at least a 90 degree included angle in the rotational direction, providing the same advantages. Anti-wind flights 68 follow the rotational path of extensions 62, and the radial outward and rearward directed leading surfaces 70 urge any plant material coming into contact therewith during the rotation thereof radially outwardly and rearwardly, so as to be collected and carried away by augers 40. Additionally, anti-wind lugs 64 extend into and rotate through annular space 78, to agitate and direct outwardly any material coming into contact therewith, so as to clear material from around front bearing housing 54. In this regard, bearing housing 54 and shroud 52 can include surfaces positioned in close proximity to the path of lugs 64 such that material that becomes trapped therebetween will be sheared or otherwise broken up, so as to be more easily removed by moving lugs 64. The radially outwardly swept back orientation of leading surfaces 66 of lugs 64 facilitates the positive directing of the material contacted thereby radially outwardly, and the orientation of anti-wind notches 88 radially outwardly from space 78 in the rotational direction facilitates and allows notches 88 to receive the material driven outwardly by lugs 64 and deliver the material to wiping surface 80. The orientation of notches 88 also makes it less likely that plant material can enter space 78 therethrough. Additionally, opening 86 allows agitated material in space 78 to fall therethrough by gravity, or be driven therethrough by lugs 64.

Here, it should be noted that the terms "rearward" and "rearwardly" are used in respect to rotor 30, as denoting toward the threshing end thereof, and not with respect to the rearward end of combine 10, as it is recognized that rotor 30 could be oriented otherwise than front to rearwardly with respect to combine 10, such as in a side to side orientation therein. Additionally, it should be noted that the terms "radial" and "radially" are used with respect to axis 32.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A threshing rotor and front bearing housing shroud assembly for an agricultural combine, comprising:

a front rotor inlet section having a front center portion, the front rotor inlet section being rotatable in a predetermined rotational direction about an axis extending through the front center portion, the front center portion including a radial outer circumferential edge portion having a predetermined radial extent, and at least one impeller having a front leading edge extending radially outwardly from the front center portion so as to be swept back relative to the predetermined rotational direction;

a front bearing housing positionable in front of the front rotor inlet section in rotatable connection with and in closely spaced opposing relation to the front center portion for supporting the front rotor inlet section for rotation about the axis, the front bearing housing including a radial outer circumferential surface having a predetermined radial extent; and a shroud extending at least substantially completely around the front bearing housing radially outwardly thereof defining a generally annular space therebetween, the shroud having a radial innermost surface having a radial extent greater than the radial extent of the front center portion so as to be located marginally radially outwardly thereof when the front rotor inlet section is supported by the front bearing housing, the shroud including a radially outwardly facing curved anti-wind wiper surface extending tangentially and radially outwardly therefrom in the predetermined direction of rotation and in position such that when the front rotor inlet section is supported by the front bearing housing and rotated relative thereto in the predetermined rotational direction, the front leading edge of the impeller will rotate in closely spaced axially opposing relation to the anti-wind wiper and will always form at least a 90° angle thereto so as to urge plant material coming into contact therewith radially outwardly away from the front bearing housing, and the front center portion of the front rotor inlet section further including at least one frontwardly extending lug positioned so as to project into and rotate through the space between the radial inner circumferential surface of the shroud and the radial outer circumferential surface of the bearing housing as the front rotor inlet section rotates relative thereto, for agitating material that enters the space.

2. The assembly of claim 1, wherein the at least one lug has a leading surface with respect to the rotational direction which is raked back relative to the rotational direction so as to urge the agitated material radially outwardly during the rotation.

3. The assembly of claim 2, wherein the shroud includes at least one radially facing opening communicating with the space in position for receiving and passage of the radially outwardly urged agitated material therethrough.

4. The assembly of claim 3, wherein the radially facing opening extends through the shroud in a direction radially outwardly from the space in the rotational direction.

5. The assembly of claim 2, wherein the shroud includes at least one downwardly facing opening therethrough for the material in the space to drop through.

6. The assembly of claim 1, wherein the front center portion includes at least one radially outwardly extending anti-wind flight on the radial outer circumferential edge portion for contacting material disposed between the front center portion and the shroud and urging said material radially outwardly therefrom.

7. The assembly of claim 6, wherein the rotor has a rearward end opposite the front rotor inlet section and the anti-wind flight includes a surface facing the predetermined rotational direction which is raked rearwardly for urging material in contact therewith radially outwardly and rearwardly.

8. A threshing rotor and front bearing housing assembly for an agricultural combine, comprising:

a rotor including a front rotor inlet section and an opposite rear end, the front rotor inlet section having a front center portion rotatable in a predetermined rotational direction about an axis extending therethrough and through the rear end, the front center portion having a generally circumferential radial outer periphery therearound having a predetermined radial extent, and at least one helical inlet auger impeller flight extending around the front rotor inlet section and rearwardly therefrom, the at least one flight having a radial inner periphery located at about the radial outer periphery of the front center portion and a leading edge extending radially outwardly therefrom in a direction so as to be swept back relative to the predetermined rotational direction;

a front bearing housing located in closely spaced opposing relation to the front center portion and supporting the front rotor inlet section for rotation in the predetermined rotational direction about the axis, the front bearing housing having a radial outer periphery which is at least generally coaxial with the front center portion and which has a predetermined radial extent which is less than the radial extent of the front center portion; and an anti-wind shroud extending at least substantially around the front bearing housing radially outwardly therefrom such that a generally annular space exists therebetween around the bearing housing, the shroud having a radial inner periphery having a predetermined radial extent greater than the radial extent of the front center portion such that the annular space is located in opposing relation to the front center portion, the shroud having a generally helicoid outer peripheral wiping surface which extends radially outwardly in the predetermined rotational direction from the shroud and which is located radially outwardly of the radial inner periphery of the leading edge of the at least one helical inlet auger flight, the wiping surface having an edge located in close proximity to the leading edge of the at least one helical inlet auger flight such that portions of the edges in closest proximity one relative to the other will always form at least a 90° included angle in the rotational direction so as to urge plant material coming into contact therewith radially outwardly away from the shroud, and the front center portion of the front rotor inlet section includes at least one frontwardly extending element positioned so as to project into and rotate through the annular space between the shroud and the bearing housing as the front rotor inlet section rotates relative thereto for directing material that enters the space radially outwardly therefrom.

9. The assembly of claim 8, wherein the front bearing housing or the shroud includes at least one element located in the space in position such that the at least one element will pass thereby in closely spaced relation thereto to agitate any material brought therebetween.

10. The assembly of claim 8, wherein the at least one element has at least one surface which faces the predetermined rotational direction and is swept back relative thereto.

11. The assembly of claim 8, wherein the shroud includes at least one opening therethrough for the passage of material directed from the space therethrough.

12. The assembly of claim 8, wherein the front center portion includes at least one anti-wind flight projecting radially outwardly from the radial outer periphery thereof which rotates therewith for contacting material which comes between the front center portion and the edge of the wiping face of the shroud for urging the material radially outwardly therefrom.

13. The assembly of claim 12, wherein the anti-wind flight includes a surface facing the predetermined rotational direction which is raked backwardly relative to the direction of rotation.

14. Apparatus for supporting an agricultural combine rotor front inlet section for rotation in a predetermined rotational direction relative thereto about an axis extending therethrough while preventing winding of plant material therearound, the rotor front inlet section including at least one helical auger flight extending therearound including a frontmost leading edge extending radially outwardly from a front center portion thereof through which the axis extends in a direction so as to be swept back relative to the rotational direction, the apparatus comprising:

an annular bearing housing for receiving a bearing for rotatably supporting the rotor front inlet section in spaced opposed relation thereto; and a shroud extending circumferentially around the bearing housing in radially outwardly spaced relation thereto, the shroud including a radially outwardly facing curved anti-wind wiper surface extending tangentially and radially outwardly therefrom in the predetermined direction of rotation and in position such that when the front rotor inlet section is supported by the bearing housing and rotated relative thereto in the predetermined rotational direction the front leading edge of the auger flight will rotate in closely spaced axially opposing relation to the anti-wind wiper and will always form at least a 90° angle thereto so as to urge plant material coming into contact therewith radially outwardly away from the front center portion, wherein the front center portion of the rotor front inlet section includes at least one lug positioned so as to rotate through the space between the bearing housing and the shroud, and the shroud further comprises at least one opening therethrough for the passage of material contacted by the at least one lug during the rotation thereof.

15. Apparatus of claim 14, wherein the bearing housing or the shroud includes at least one element in the space therebetween in position for contacting material carried by the at least one lug during the rotation thereof for agitating the material in cooperation with the at least one lug.

16. Apparatus of claim 15, wherein the at least one opening comprises a notch in a rearward most edge of the shroud, the notch extending at least partially in the rotational direction.

* * * * *